US007694090B2

(12) United States Patent
Hosouchi et al.

(10) Patent No.: US 7,694,090 B2
(45) Date of Patent: Apr. 6, 2010

(54) STORAGE SYSTEM WITH JOURNAL REFLECTING AREA CONTROL FUNCTION

(75) Inventors: Masaaki Hosouchi, Zama (JP); Kenichi Oyamada, Yokohama (JP); Yuri Hiraiwa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 912 days.

(21) Appl. No.: 11/335,150

(22) Filed: Jan. 18, 2006

(65) Prior Publication Data
US 2007/0106855 A1 May 10, 2007

(30) Foreign Application Priority Data
Nov. 7, 2005 (JP) ............................. 2005-322184

(51) Int. Cl.
*G06F 12/00* (2006.01)
*G06F 13/00* (2006.01)
*G06F 13/28* (2006.01)
(52) U.S. Cl. .................................................. 711/162
(58) Field of Classification Search .................. 711/162
See application file for complete search history.

(56) References Cited

U.S. PATENT DOCUMENTS 5,353,411 A * 10/1994 Nakaosa et al. ................. 713/1
6,487,645 B1 * 11/2002 Clark et al. ................... 711/162
7,107,418 B2 * 9/2006 Ohran ........................... 711/161
2003/0009438 A1 1/2003 Achiwa et al.
2004/0268067 A1 * 12/2004 Yamagami ................... 711/159
2005/0132155 A1 * 6/2005 Kasako ........................ 711/162
2005/0278494 A1 * 12/2005 Hillier et al. ................. 711/162

FOREIGN PATENT DOCUMENTS

| JP | 2003-015933 | 1/2003 |
| JP | 2005-018738 | 1/2005 |
| JP | 2005-174196 | 6/2005 |

* cited by examiner

*Primary Examiner*—Sheng-Jen Tsai
(74) *Attorney, Agent, or Firm*—Townsend and Townsend and Crew LLP

(57) ABSTRACT

This invention relates to data backup and data recovery in a computer system. An outputting unit updates data stored in a first area based on an update request of data from the host computer, a creating unit stores update data for the update request in a second area, a marker processing unit creates a marker containing information of the range, in which the data is stored, and information indicating whether or not the data is allowed to be stored in a third area based on a request of creating the marker from the host computer to store the created marker in the second area, and a reflecting unit refers to the marker, obtains the update data corresponding to the data storing range, which is stored prior to the marker, and reflects the obtained update data to the third area.

16 Claims, 18 Drawing Sheets

| IDENTIFIER OF STORAGE SYSTEM INCLUDING PRIMARY VOLUME ~242 | IDENTIFIER OF LOGICAL VOLUME SERVING AS PRIMARY VOLUME ~243 | IDENTIFIER OF STORAGE SYSTEM INCLUDING SECONDARY VOLUME ~244 | IDENTIFIER OF LOGICAL VOLUME SERVING AS SECONDARY VOLUME ~245 |
|---|---|---|---|
| ⋮ | ⋮ | ⋮ | ⋮ |

PAIR MANAGEMENT TABLE 240

FIG. 2

| | | 203 | 204 | 205 | 206 | 207 | 208 |
|---|---|---|---|---|---|---|---|
| 201A | ENTRY | LOGICAL VOLUME IDENTIFIER | DATA ADDRESS | DATA LENGTH | SEQUENCE NUMBER | REFLECTING AREA IDENTIFIER | CHECKPOINT IDENTIFICATION FLAG |
| | | 1111 | A1 | 4096 | 1 | IDA | OFF |
| | | UPDATE DATA OF A1 | | | | | |
| 201B | ENTRY | 1111 | B1 | 4096 | 1 | IDB | OFF |
| | | UPDATE DATA OF B1 | | | | | |
| 201C | ENTRY | 1111 | A2 | 4096 | 1 | IDA | OFF |
| | | UPDATE DATA OF A2 | | | | | |
| 201D | ENTRY | — | — | 0 | — | IDA | ON |
| | | — | | | | | |
| 201E | ENTRY | 1111 | B2 | 4096 | 1 | IDB | OFF |
| | | UPDATE DATA OF B2 | | | | | |

JOURNAL DATA 200

FIG. 4

| FILE IDENTIFIER 112 | REFLECTING AREA IDENTIFIER 113 |
|---|---|
| FILE A | IDA |
| FILE B | IDB |
| ⋮ | ⋮ |

REFLECTING AREA IDENTIFIER MANAGEMENT TABLE 110

*FIG. 5*

| REFLECTING AREA IDENTIFIER ~222 | LOGICAL VOLUME IDENTIFIER ~223 | START ADDRESS ~224 | DATA LENGTH ~225 |
|---|---|---|---|
| IDA (221A) | A1 | 1111 | 4096 |
| | A2 | 1111 | 4096 |
| IDB (221B) | B1 | 1111 | 4096 |
| | B2 | 1111 | 4096 |
| ⋮ | ⋮ | ⋮ | ⋮ |

REFLECTING AREA MANAGEMENT TABLE 220

FIG. 6

CATALOG 250

| JOB IDENTIFIER ~121 | FILE IDENTIFIER ~122 |
|---|---|
| : | : |

JOB MANAGEMENT TABLE 120

*FIG. 9*

STORAGE SYSTEM WITH JOURNAL REFLECTING AREA CONTROL FUNCTION

CLAIM OF PRIORITY

The present application claims priority from Japanese application P2005-322184 filed on Nov. 7, 2005, the content of which is hereby incorporated by reference into this application.

BACKGROUND

This invention relates to data backup and data recovery for a computer system.

In order to reduce the risk of losing data stored in a storage system due to a disaster or a failure, a method of creating and storing a copy of the data stored in the storage system is known. As techniques of creating a copy, there are a backup and restore technique and a remote copy technique, both using a journal.

For example, the following technique is known as the backup and restore technique using a journal. In other words, a storage system maintains a journal of a plurality of journal entries and at least one snapshot of one or more data volume. By assigning a unique sequence number to each of the journal and the snapshot in the order of occurrence, it becomes easy to find out a journal to be applied to the snapshot. In this manner, an overflow condition causing the exhaustion of a journal space is detected to recover the journal space, as described in JP 2005-18738 A.

The following technique is known as the remote copy technique using a journal. In other words, at least two secondary storage systems are connected to a primary storage system connected to an upstream device. The secondary storage systems read out journals of data update from the primary storage system at their own timings so as to save the read journals in predetermined logical volumes. Then, the secondary storage systems create copies of the data in the primary storage system based on the journals stored in the virtual volumes at their own timings so as to store the copies in secondary virtual volumes. The primary storage system retains the journals until both the secondary storage systems read and restore the journals. The timing of journal read is controlled according to the quantity of journals, a processing load and the like, as described in JP 2005-174196 A.

SUMMARY

In the technique described in JP 2005-18738 A cited above, when the snapshot is recovered from the journal data, all the data before the designated time present in the journal is written to a secondary volume. However, when data of a plurality of programs are present in the journal, there is a possibility that inconsistency may occur in the data because a file is being updated at the designated time in one program even though the designated time corresponds to a checkpoint in another program. Since the programs operate independently, it is difficult to provide the checkpoints at the same time for the plurality of programs. Although this problem can be prevented if the volumes that store files to be used and the journals are separated for each program, the usability of the volumes or the journals is disadvantageously lowered.

It is therefore an object of this invention to provide a method of storing data in a secondary volume at a checkpoint of each of a plurality of programs while volumes and journals are being shared by the plurality of programs, for data used by each of the programs.

An aspect of this invention relates to a computer system, comprising: a host computer comprising an interface coupled to a storage system through a network, a processor coupled to the interface, and a memory coupled to the processor; and the storage system comprising an interface coupled to the host computer through a communication path, a disk drive that stores data, a controller that controls input and output of data to/from the disk drive, and a memory that stores information, wherein: the disk drive comprises a first area that stores data accessed by the host computer, a second area that stores update data of the data stored in the first area, and a third area that stores a copy of the data stored in the first area; the controller comprises an outputting module that outputs data to the disk drive, a creating module that creates an entry from the update data, a reflecting module that reflects the update data to the third area, and a marker processing module that creates a marker containing information indicating whether or not the update data is allowed to be stored in the third area to store the marker in the second area; the outputting module updates the data stored in the first area based on an update request of the data from the host computer; the creating module stores update data for the update request in the second area; the marker processing module creates a marker containing information of the range, in which the data is stored, and information indicating whether or not the data is allowed to be stored in the third area based on a request of creating the marker from the host computer to store the created marker in the second area; and the reflecting module refers to the marker obtains the update data corresponding to the data storing range, which is stored prior to the marker, and reflects the obtained update data to the third area.

According to this embodiment, even when data of a plurality of programs are present in journal data, data of each of the programs at its own checkpoint can be retained in the secondary volume. As a result, a copy of the data in the primary volume can be stored with consistency from each of the plurality of programs while the volumes or the journals are being shared by the plurality of programs.

BRIEF DESCRIPTION OF THE DRAWINGS

FIG. 2 is an explanatory view of a pair management table according to the first embodiment of this invention.

FIG. 4 is an explanatory view of journal data according to the first embodiment of this invention.

FIG. 5 is an explanatory view of a reflecting area identifier management table according to the first embodiment of this invention.

FIG. 6 is an explanatory view of a reflecting area management table according to the first embodiment of this invention.

FIG. 9 is an explanatory view of a job management table according to the first embodiment of this invention.

DETAILED DESCRIPTION OF THE INVENTION

Hereinafter, embodiments of this invention will be described in detail with reference to the accompanying drawings.

The embodiments of this invention are realized as a process executed in a computer system in which a host computer 1 and a storage system 2 are connected to each other through a communication path.

Hereinafter, the embodiments of this embodiment will be described.

First Embodiment

Figure 1:
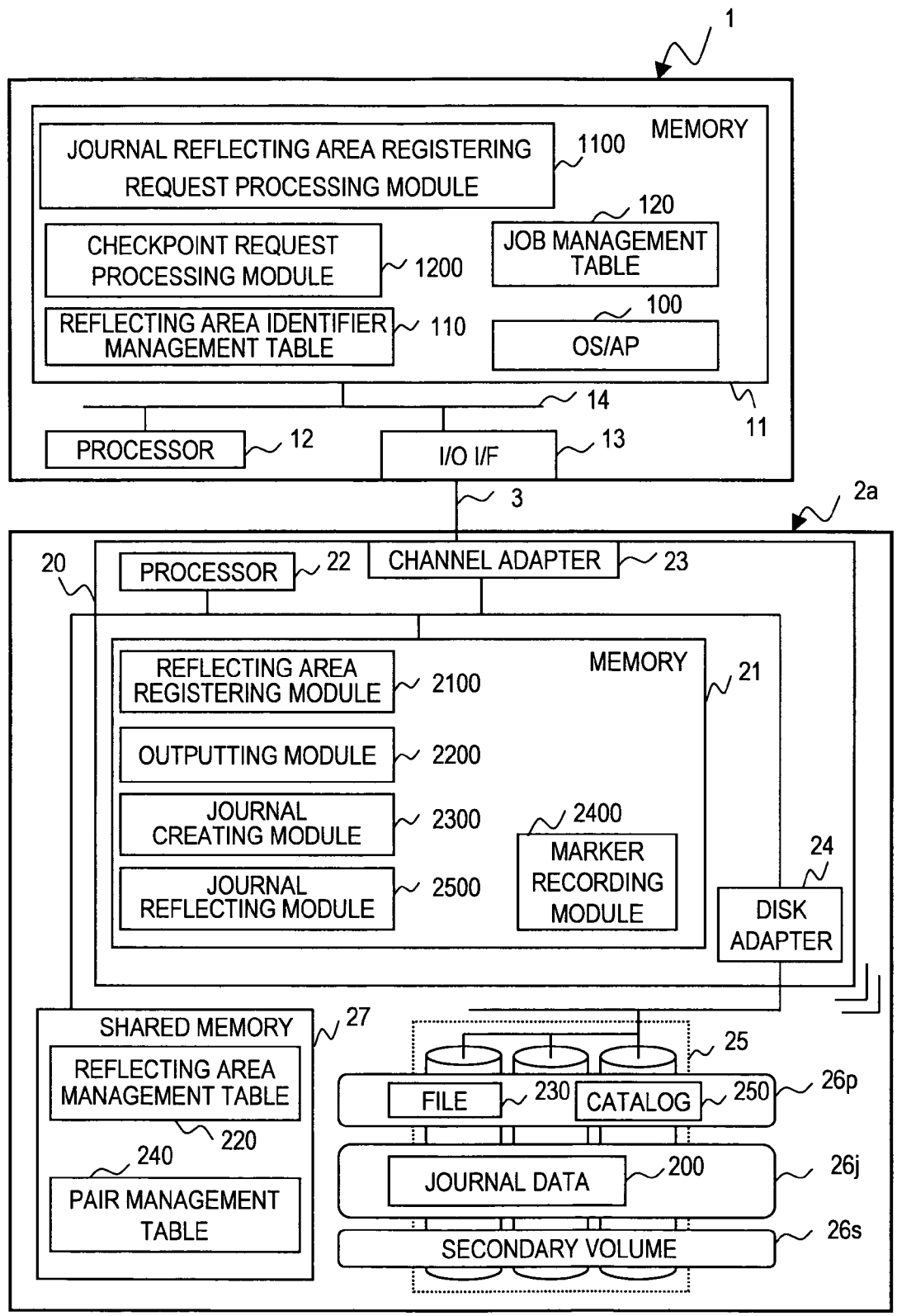
FIG. 1 is a configuration block diagram of a computer system according to a first embodiment of this invention.

FIG. 1 is a configuration block diagram of a computer system according to a first embodiment of this invention.

The computer system comprises a host computer 1, a storage system 2 connected to the host computer 1, and a communication path 3 for connecting the host computer 1 and the storage system 2 to each other.

The host computer 1 issues a request to the storage system 2 and receives the result of the request from the storage system 2. More specifically, the host computer 1 requests read and write of data stored in a disk drive 25 of the storage system 2 or the like.

The host computer 1 comprises a memory 11, a processor 12 and an I/O interface (I/F) 13. The memory 11, the processor 12 and the I/O I/F 13 are connected to each other through a bus 14.

The memory 11 stores a program and information used by the program. The memory 11 may be any of a volatile memory such as a RAM, a non-volatile memory such as a hard disk, and a combination thereof.

The processor 12 reads the program stored in the memory 11 so as to execute a process defined in the program.

The I/O I/F 13 is connected to the communication path 3 so as to transmit and receive data to/from the storage system 2 through the communication path 3. The I/O I/F 13 is constituted by, for example, a host channel adapter.

The memory 11 stores an operating system and application program (OS/AP) 100 and programs for a journal reflecting area registering request processing module 1100, a checkpoint request processing module 1200, a reflecting area identifier management table 110, a job management table 120 and the like. When these programs are read to be executed by the processor 12, the respective functions are executed.

The OS/AP 100 comprises an application program that requests an access to a file in the storage system 2 and an operating system that requests the storage system 2 to input and output the file in response to the access request from the application program.

The journal reflecting area registering request processing module 1100 manages, for data stored in the storage system 2, information indicating which area stores which data.

The checkpoint request processing module 1200 requests the storage system 2 to create a checkpoint.

The reflecting area identifier management table 110 stores, for the data stored in the storage system 2, information indicating which area stores which data.

The job management table 120 stores, for the data stored in the storage system 2, information indicating which data is used by which application.

The communication path 3 is a communication channel for connecting the host computer 1 and the storage system 2 to each other so that data can be transmitted and received therebetween. The communication path 3 comprises, for example, an optical fiber cable and a switch.

The storage system 2 reads and writes the data stored in the disk drive 25 in response to a request from the host computer 1.

The storage system 2 comprises a controller 20, the disk drive 25 and a shared memory 27.

The controller 20 receives a request from the host computer 1 through the communication path 3 to execute a process according to the received request.

The controller 20 comprises a memory 21, a processor 22, a channel adapter 23, a disk adapter 24 and the shared memory 27.

The memory 21 stores a program and information used by the program. The memory 21 may be any one of a volatile storage device such as a RAM, a non-volatile storage device such as a hard disk, and a combination thereof.

The processor 22 reads the program stored in the memory 21 so as to execute a process defined in the program.

The channel adapter 23 is connected to the communication path 3 so as to transmit and receive data to/from the host computer 1 through the communication path 3.

The disk adapter 24 transmits and receives data to/from the disk drive 25 in accordance with a request for a process executed by the processor 22.

The disk drive 25 is a storage device including at least one hard disk drive corresponding to a physical storage area.

The shared memory 27 stores information regarding a configuration and control of the storage system 2.

A plurality of the control devices 20 or the disk drives 25 may be provided in one storage system 2. Moreover, a plurality of the channel adapters 23 may be provided in one storage system 2. The shared memory 27 may store data shared by a plurality of the storage systems 20.

Next, each of the modules will be described in detail.

The memory 21 stores programs of a reflecting area registering module 2100, an I/O module 2200, a journal creating module 2300, a marker recording module 2400, a journal reflecting module 2500 and the like. When the programs are read and executed by the processor 22, their own functions are executed.

The reflecting area registering module 2100 manages, for data stored in a logical volume 26 of the disk drive 25, information indicating which area stores which data.

The I/O module 2200 inputs and outputs the data stored in the logical volume 26 of the disk drive 25 through the disk adapter 24 in response to a request from another program or a request from the host computer 1.

The journal creating module 2300 creates journal data 200.

The marker recording module 2400 records checkpoints and markers in the journal data 200.

The journal reflecting module 2500 executes a difference reflecting process described below.

The disk drive 25 comprises at least one logical volume obtained by logically dividing a physical storage area. In this embodiment, three logical volumes 26, in other words, a primary volume 26p, a journal volume 26j and a secondary volume 26s, are provided as the logical volume.

One logical volume may be set for one disk drive 25. Alternatively, each of a plurality of areas obtained by logically dividing the disk drive 25 may be set as a logical volume. Further alternatively, the disk drive 25 may be configured as a RAID (Redundant Arrays of Inexpensive Disks) disk array so that an area that spans a plurality of the disk drives 25 may be set as the logical volume 26. The host computer 11 accesses the logical volumes 26 as a single physical volume.

The logical volumes 26 stores a file 230 accessed by the application program of the host computer 1. One logical volume 26 can store a plurality of the files 230.

One of the logical volumes 26, which stores the file 230 accessed by the application program of the host computer 1, is referred to as the primary volume 26p.

When an update request is issued to the file 230 stored in the primary volume 26p, the controller 20 stores the journal data 200 corresponding to an update history of the file 230 in the logical volume 26 different from the primary volume 26p. The logical volume storing the journal data is referred to as the journal volume 26j.

The controller 20 copies the contents in the primary volume 26p to the logical volume 26 different from the primary volume 26p so as to create a backup of the primary volume 26p. The logical volume 26 is referred to as the secondary volume 26s. The relation between the primary volume 26p and the secondary volume 26s is referred to as a copy pair.

The shared memory 27 stores the reflecting area management table 220 and the pair management table 240.

The reflecting area management table 220 stores information managed by the reflecting area registering module 2100, in other words, information indicating which area stores which data.

When the primary volume 26p and the secondary volume 26s form a copy pair, the pair management table 240 stores information of the primary volume 26p and the secondary volume 26s.

Next, a process of copying data in the primary volume 26p to the secondary volume 26s will be described.

For the primary volume 26p, the controller 20 copies all the data stored in the primary volume 26p at a given time to the secondary volume 26s as a backup. At this point, the contents of the primary volume 26p become the same as those stored in the secondary volume 26s.

Thereafter, when an update request is issued from the host computer 1 to the file 230 in the primary volume 26p, the controller 20 stores the update history of the file 230 in the journal volume 26j. The update history data stored in the journal volume 26j is referred to as the journal data 200. An update history is stored each time an update request is issued.

Thereafter, the controller 20 uses the journal data 200 to execute a difference reflecting process. The difference reflecting process reflects the update history stored in the journal data 200 to the secondary volume 26s. As a result, the contents in the secondary volume 26s become the same as those in the primary volume 26p at the time of execution of the differential reflecting process.

FIG. 2 is an explanatory view of the pair management table 240.

As described above, the copy pair is created between the primary volume 26p and the secondary volume 26s. The pair management table 240 stores the relation of correspondence of the copy pair. The pair management table 240 is stored in the shared memory 27 or the main memory 21.

The pair management table 240 contains entries 241, each including an identifier allowing the logical volume to be uniquely identified in the storage system 2. Each of the entries 241 of the pair management table 240 comprises an identifier of the storage system including the primary volume 26p forming the copy pair, an identifier of the logical volume serving as the primary volume 26p, an identifier of the storage system including the secondary volume 26s, and an identifier of the logical volume serving as the secondary volume 26s.

Next, an operation of this embodiment will be described.

In the storage system 2 configured as described above, the difference reflecting process is performed on the secondary volume 26s by using the differential history data stored after the previous difference reflecting process, which is stored in the journal data 200. By the difference reflecting process, the latest data at the time of executing the difference reflecting process is reflected to the storage of the secondary volume 26s. The data reflected to the secondary volume 26s is referred to as a snapshot.

Generally, the difference reflecting process is performed asynchronously with the output process to the primary volume 26p. Therefore, the contents of the snapshot reflected to the secondary volume 26s comprise data which has not been output yet and data being operated by a task application. More specifically, there arises a problem in that unnecessary data is read because a file does not contain a mark indicating the end of the file, a part of the file is lost, a pointer to another location in a self file contained in the file does not indicate a correct position, or the like.

In order to correctly store the data such as the file found in the snapshot reflected to the secondary volume 26s, it is necessary to perform a file closing process, a flush process or the like on the file. The file closing process terminates an access of the application program to the file, which has been accessed to the file. The flush process outputs all the output data remaining in a buffer of the host computer 1 to the storage system 2 so that the contents of the file handled by the application become the same as those of the file in the logical volumes 26.

In some cases, however, the plurality of files 230 are stored in the primary volume 26p, from which the journal data is to be obtained, and are respectively accessed by different application software. In such a case, accesses to all the files 230 cannot often be terminated at the same time to set the same checkpoint.

If the plurality of files 230 cannot be handled at the same checkpoint, the time of terminating the access to the file differs for each of the files 230. Therefore, if all the journal data before the checkpoints are reflected to the secondary volume 26s, incomplete file data is present. Therefore, the file 230 whose contents cannot be correctly read is generated.

Therefore, the following process is executed in this embodiment.

Figure 3:
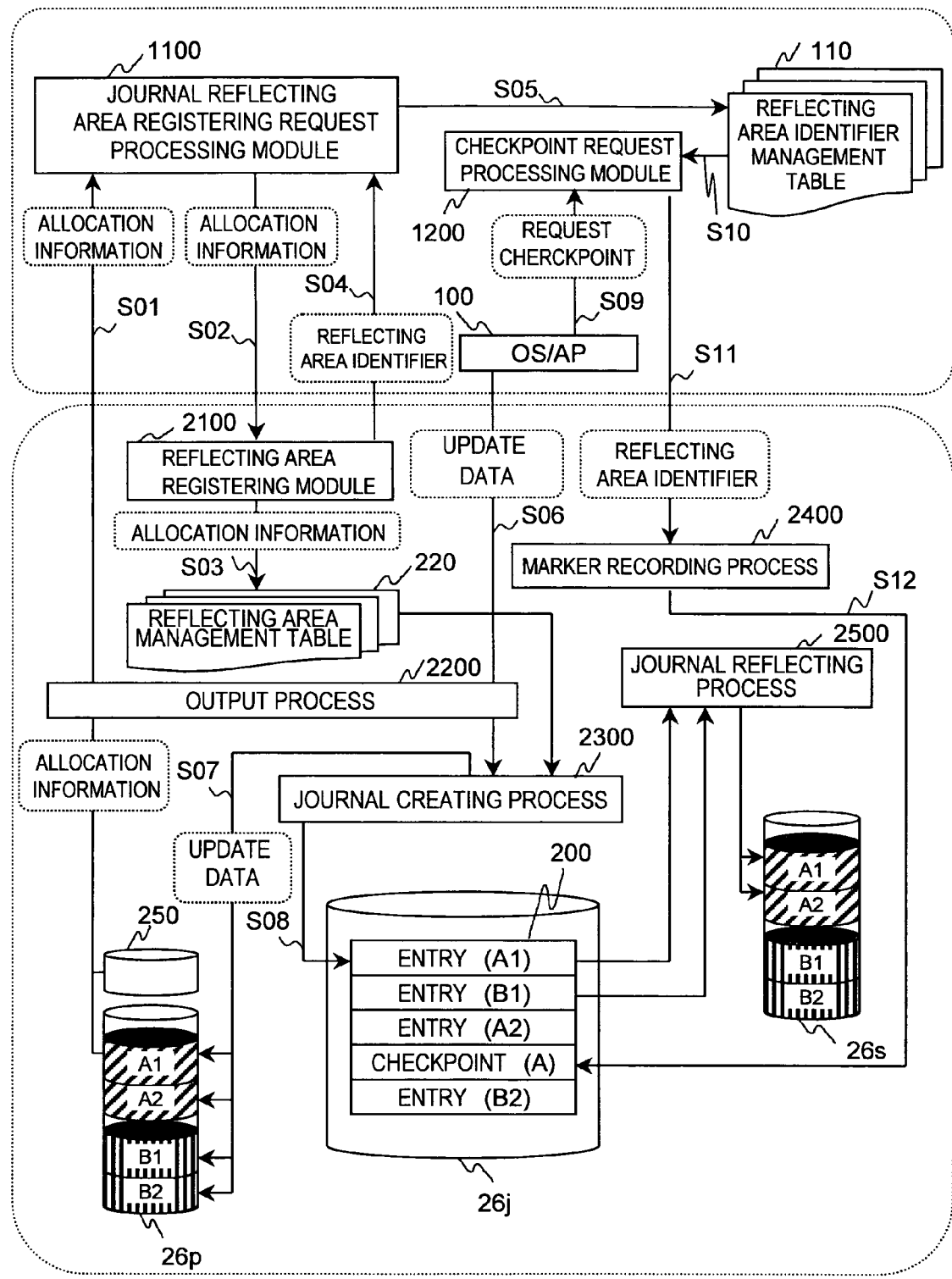
FIG. 3 is an explanatory view of a process executed by the computer system according to the first embodiment of this invention.

FIG. 3 is an explanatory view of a process executed in the computer system according to this embodiment.

In the computer system according to this embodiment, when an output request to the primary volume 26p is issued from the host computer 1, update data is stored as the journal data 200. Then, the data stored in the journal data 200 is reflected to the secondary volume 26s.

As a preprocess, the host computer 1 obtains an area in which the file 230 stored in the primary volume 26p is present and then stores the obtained area in the reflecting area identifier management table 110.

Thereafter, the host computer 1 performs the output process on the primary volume 26p of the storage system 2 so as to store the update history data in the journal volume 26j as the journal data 200. At this time, a set reflecting area identifier is stored with the update data in the journal data 200. Moreover, a checkpoint is set in the journal data 200 at a predetermined time.

Thereafter, when a snapshot is created in the secondary volume 26s by using the journal data 200, only a part of the data stored in the journal data 200, for which the reflecting area identifier 222 is set, is reflected.

Hereinafter, the process will be described.

First, the journal reflecting area registering request processing module 1100 obtains allocation information of the file 230 from a catalog 250 stored in the primary volume 26p from which the journal data 200 is to be obtained (process S01). Then, the journal reflecting area registering request processing module 1100 transfers the obtained allocation information to the reflecting area registering module 2100 of the storage system 2 including the primary volume 26p (process S02).

The allocation information contains one or a plurality of logical volume identifiers of the primary volume 26p to which the file 230 is allocated, one or a plurality of area data addresses in the primary volume 26p to which the file 230 is allocated, and a data length of the file 230.

Upon reception of the allocation information transferred from the journal reflecting area registering request processing module 1100, the reflecting area registering module 2100 assigns the reflecting area identifier 222 to each entry of the transferred allocation information. Then, the journal reflecting area registering request processing module 1100 stores the allocation information and the allocated reflecting area identifier 222 in the reflecting area management table 220 in the shared memory 27 (process S03). Then, the reflecting area registering module 2100 transmits the assigned reflecting area identifier 222 to the journal reflecting area registering request processing module 1100 (process S04).

The reflecting area identifier 222 uniquely identifies the allocation information in the storage system 2.

The journal reflecting area registering request processing module 1100 stores a file identifier 112 and the reflecting area identifier 222 transmitted from the reflecting area registering module 2100 in the reflecting area identifier management table 110 in the memory 11 (process S05). The file identifier 112 is an identifier such as a file name, which uniquely identifies the file 230 in the host computer 1.

Next, when an output request is issued from the OS/AP 100 of the host computer 1 (process S06), the outputting module 2200 writes update data in the primary volume 26p (process S07). At this time, the journal creating module 2300 creates an entry 201 of the journal data 200 to store the update data therein (process S08). When the output request is addressed to the file 230, the reflecting area identifier 222 corresponding to the file 230 is obtained from the reflecting area management table 220 so as to be stored in the entry 201 of the journal data 200.

Next, a process of inserting a checkpoint into the journal data 200 is executed based on a checkpoint request.

The OS/AP 100 accesses the primary volume 26p in the storage system 2. In this case, the OS/AP 100 issues a checkpoint request at the time of closing the file or finishing a job corresponding to an executable unit of the application program (process S09). The checkpoint request is received by the checkpoint request processing module 1200.

The checkpoint request processing module 1200 obtains the reflecting area identifier 222 corresponding to the file 230 to be closed or the file 230 of the job to be finished from the reflecting area identifier management table 110 (process S10). Then, the checkpoint request processing module 1200 transfers the obtained reflecting area identifier 222 to the marker recording module 2400 of the storage system 2 (process S11).

Upon reception of the transferred reflecting area identifier 222, the marker recording module 2400 creates an entry 201 of the journal data 200, which indicates the checkpoint, and stores the entry 201 in the journal data 200 (process S12). The entry 201 contains the reflecting area identifier 222. For the entry 201, a checkpoint identification flag 208 is set "ON".

In this manner, the checkpoint containing the reflecting area identifier 222 and the checkpoint identification flag 208 "ON" is referred to as a "marker" in this embodiment. The marker indicates that all the data designated by the reflecting area identifier 222 contained in the marker, in other word, a file which contains the all the data and is processed as a unit by the host computer 1 is closed. Therefore, all the data designated by the reflecting area identifier 222 contained in the marker in the update data prior to the recording of the marker can be reflected to the secondary volume 26s as already processed data.

In the example shown in FIG. 3, update requests to data A issued from the host computer 1 are stored as entries (A1 and A2) of the journal data 200. Update requests to data B issued from the host computer 1 are stored as entries (B1 and B2) of the journal data 200. A checkpoint request to the data A issued from the host computer 1 is stored as a checkpoint (A) of the journal data 200. In other words, the checkpoint (A) serves as an identifier indicating the checkpoint of the data A.

On the other hand, since a checkpoint request to the data B has not been issued yet, a checkpoint corresponding to the checkpoint request to the data B is not stored in the journal data 200.

As a result, in the storage system 2, the entries (the entries (A1 and A2)) of the data A stored prior to the checkpoint (A) show that the data A is completed in the host computer 1. On the other hand, since a checkpoint has not been stored yet for the data B, it is found that the data B is not completed in the host computer 1.

Thereafter, a process of reflecting data in the area of the journal data 200, for which the reflecting area identifier 222 is set, to the secondary volume 26s is performed.

The journal reflecting module 2500 searches for the journal data 200 the entry 201 with the checkpoint identification flag 208 being ON. When the entry 201 with the checkpoint identification flag 208 being ON is found, the journal reflecting module 2500 obtains the reflecting area identifier 222 stored in the entry 201. Then, the journal reflecting module 2500 searches the entry 201 including the same reflecting area identifier 222 as the obtained reflecting area identifier 222 from the entries 201 stored prior to the previously searched entry 201. Then, the journal reflecting module 2500 reflects the update data contained in the searched entry 201 to the secondary volume 26s.

In the above-described manner, the computer system according to this embodiment sets the reflecting area identifier 222 for identifying an area is set for an area of the primary volume 26p. Then, when a checkpoint for data contained in the area is set, a journal entry, to which the reflecting area identifier 222 is attached, is added as a marker. Thereafter, when journal data is reflected to the secondary volume 26s, only the area indicated by the identifier 222 added to the marker entry is reflected as snapshot data. In this manner, it is possible to reflect only the completed file on the host computer 1 side to the secondary volume 26s.

FIG. 4 is an explanatory view of an example of the journal data 200.

The entries 201 are sequentially stored in the journal data 200.

When an output request, in other words, a data write request or a data update request is issued to the primary volume 26p in the storage system 2, the controller 20 adds and stores a new entry 201 to the journal data 200 each time the controller 20 processes the request.

The journal data 200 contains the entries 201, each containing update data 202, a logical volume identifier 203, a data address 204, a data length 205, a sequence number 206, a reflecting area identifier 207, and a checkpoint identification flag 208.

The update data 202 corresponds to the contents of update history data written to the primary volume 26p in response to the output request.

The logical volume identifier 203 uniquely identifies a logical volume of the primary volume 26p, to which the update data is written, in the storage system 2.

The data address 204 is a block address indicating the location in the primary volume 26p where the update data is stored.

The data length 205 is a data length of the update data.

The sequence number 206 is a serial number for guaranteeing the order of storing the journal data. The sequence number 206 is stored in the shared memory 27 or the memory 21 and is managed for each of the journal data 200.

The reflecting area identifier 207 identifies an area such as a file containing the update data.

The checkpoint identification flag 208 is an identifier that indicates whether the entry is a checkpoint or not. More specifically, when the checkpoint identification flag 208 is set "ON", the entry is a checkpoint. On the other hand, when the checkpoint identification flag 208 is set "OFF", the entry is an entry that is not a checkpoint, for example, update data.

In the example shown in FIG. 4, the journal data 200 stores entries 201A to 201E. For example, the entry 201A stores "1111" as the logical volume identifier 203, "A1" as the data address 204, "4096" as the data length 205, "1" as the sequence number 206, "IDA" as the reflecting area identifier 207, and "OFF" as the checkpoint identification flag 208.

FIG. 5 is an explanatory view of the reflecting area identifier management table 110.

The reflecting area identifier management table 110 is managed by the journal reflecting area registering request processing module 1100 of the host computer 1.

The reflecting area identifier management table 110 contains entries 111, each containing the file identifier 112 and a reflecting area identifier 113.

The file identifier 112 is an identifier such as a file name, which uniquely identifies the file 230 in the host computer 1.

The reflecting area identifier 113 is allocation information of the file indicated by the file identifier 112. The reflecting area identifier 113 stores the reflecting area identifier 222 determined by the reflecting area registering module 2100.

In the example shown in FIG. 5, two entries 111A and 111B are shown. In the entry 111A, for a file whose file identifier 112 indicates "File A", "IDA" is set as the reflecting area identifier 113.

FIG. 6 is an explanatory view of the reflecting area management table 220.

The reflecting area management table 220 is managed by the reflecting area registering module 2100 of a storage system 2.

The reflecting area management table 220 contains the entries 221, each containing the reflecting area identifier 222, the logical volume identifier 223, the start address 224, and the data length 225.

The reflecting area identifier 222 corresponds to one piece of or a plurality of pieces of data stored in the logical volume serving as the primary volume 26p.

The logical volume identifier 223, the start address 224, and the data length 225 correspond to allocation information of the data indicated by the reflecting area identifier 222. The logical volume identifier 223 is an identifier of the logical volume including the area. The start address 224 is a start address of the area in the logical volume. The data length 225 is a length of the data stored in the area.

When the allocation information comprises of a plurality of logical volumes or a plurality of areas, a plurality of pieces of allocation information (the logical volume identifiers 223, the start addresses 224, and the data lengths 225) corresponding to the reflecting area identifier 222 are contained in one entry 221.

In the example shown in FIG. 6, two entries 221A and 221B are shown. The entry 221A stores two pieces of allocation information for "IDA" stored as the reflecting area identifier 222. For one of the allocation information, "A1" is set as the logical volume identifier 223, "1111" as the start address 224, and "4096" as the data length 225. For the other allocation information, "A2" is set as the logical volume identifier 223, "1111" as the start address 224, and "4096" as the data length 225.

Figure 8:
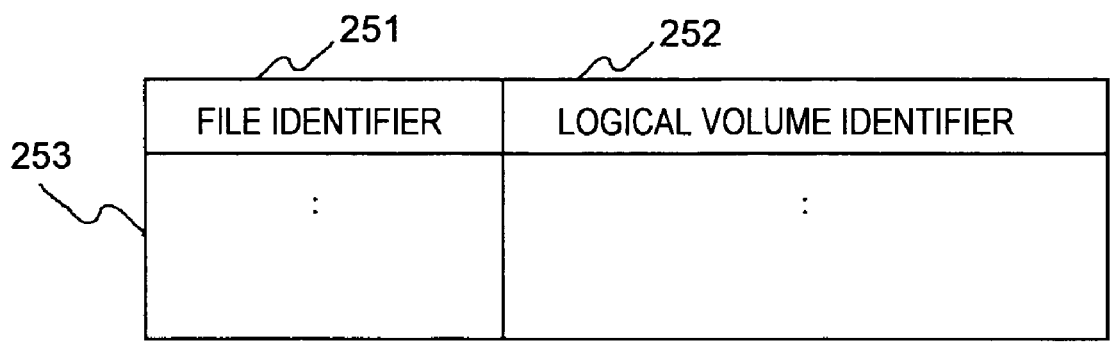
FIG. 8 is an explanatory view of a catalog according to the first embodiment of this invention.

FIG. 8 is an explanatory view of the catalog 250.

The catalog 250 is a table stored in the primary volume 26p. The catalog 250 indicates which logical volume in the storage system stores the file 230 stored in the storage system 2.

The catalog 250 contains entries 253, each including a file identifier 251 such as a file name, which identifies the file 230 that is referred to by the host computer 1, and a logical volume identifier 252 indicating a logical volume that stores the file 230.

The file identifier 251 is a logical volume identifier identified by the host computer 1, and therefore is sometimes different from the logical volume identifier managed in the storage system 2. In this case, the host computer 1 designates the file identifier 251 to access the storage system 2. The storage system 2 obtains the logical volume identifier corresponding to the designated file identifier.

FIG. 9 is an explanatory view of the job management table 120.

The job management table 120 is a table indicating a file used by a job of the application program operating in the OS/AP 100 in the host computer 1.

The job management table 120 comprises entries 123, each including a job identifier 121 that uniquely identifies a job in the host computer 1 and a file identifier 122 that uniquely identifies the file 230 in the host computer 1.

Figure 7:
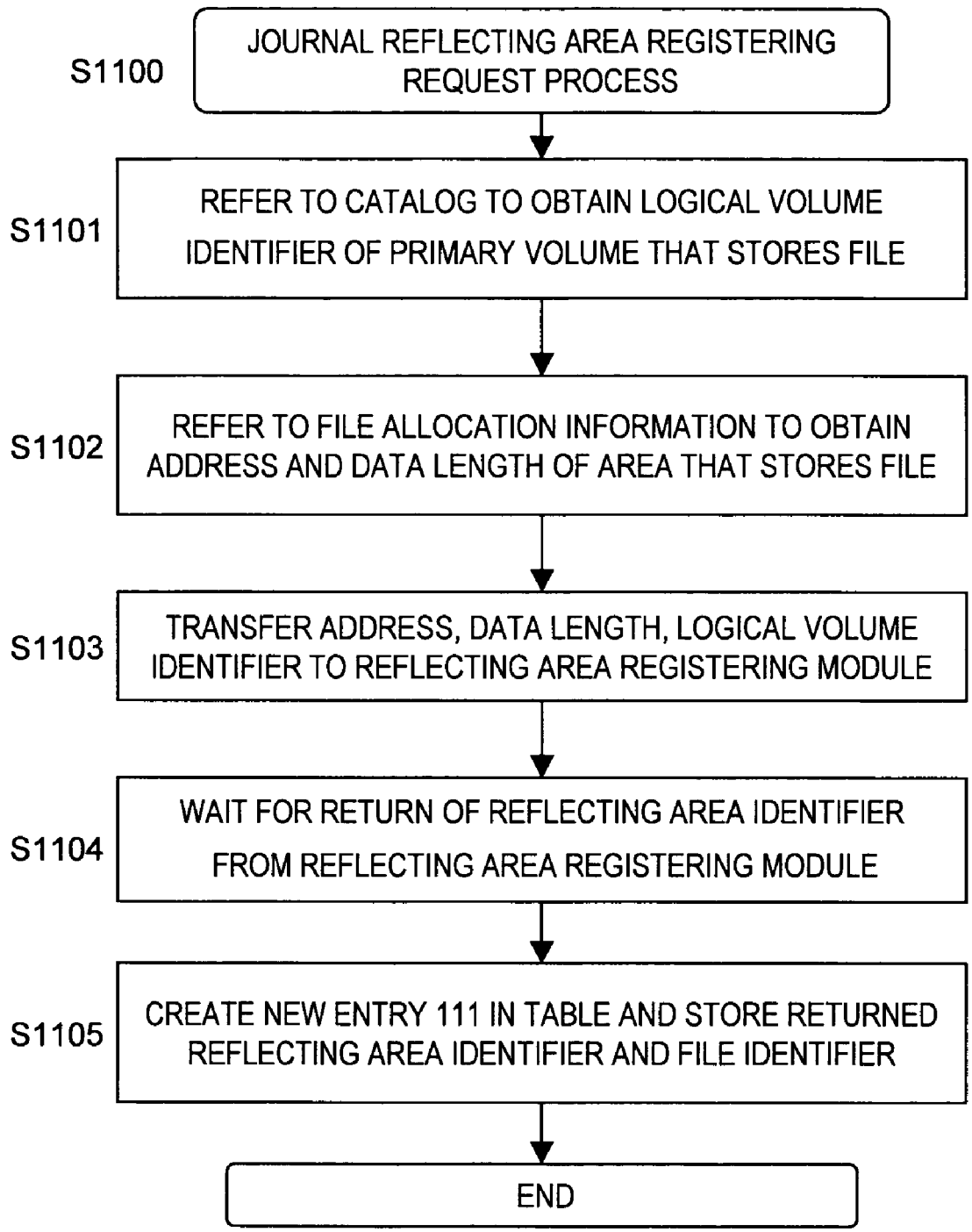
FIG. 7 is a flowchart of a journal reflecting area registering request process according to the first embodiment of this invention.

FIG. 7 is a flowchart of a process of the journal reflecting area registering request processing module 1100.

The process is executed as a preprocess executed prior to the access of the OS/AP 100 to the file 230 in the primary volume 26p in the storage system 2.

More specifically, the process is executed immediately before the OS/AP 100 opens the file 230, in other words, the file 230 is put into a state accessible from the application program. The process may also be executed at the time when the application program starts a job corresponding to the file 230 (step S1100).

First, the journal reflecting area registering request processing module 1100 refers to the catalog 250 stored in the primary volume 26p in the storage system 2. Then, the journal reflecting area registering request processing module 1100 obtains the logical volume identifier of the primary volume 26p that stores the file 230 (step S1101).

Next, the journal reflecting area registering request processing module 1100 refers to the allocation information of the file 230 stored in the obtained primary volume 26p. Then, the journal reflecting area registering request processing module 1100 obtains an address and a data length of the area storing the file 230 in the primary volume 26p (step S1102).

Next, the journal reflecting area registering request processing module 1100 transfers the data (a reflecting area registering request), to which an identification code of a reflecting area registering request is added, to the reflecting area registering module 2100. The reflecting area registering request contains the allocation information corresponding to the set of the logical volume identifier of the obtained primary volume 26p, the start address of the address, and the data length (step S1103). Then, the journal reflecting area registering request processing module 1100 waits for the return of the reflecting area identifier 222 from the reflecting area registering module 2100 (step S1104).

The reflecting area registering request processing module 2100 creates the reflecting area identifier 222 corresponding to a unique identifier for the area corresponding to the transferred allocation information. Then, the reflecting area registering request processing module 2100 returns the created reflecting area identifier 222 to the journal reflecting area registering request processing module 1100 that has transferred the reflecting area registering request.

When the reflecting area identifier 222 is returned from the reflecting area registering module 2100, the journal reflecting area registering request processing module 1100 creates a new entry 111 in the reflecting area identifier management table 110. Then, the reflecting area registering request processing module 1100 stores the file identifier 112 of the file 230 and the returned reflecting area identifier 222 in the created entry (step S1105).

By the process as described above, the reflecting area identifier 222 of the file 230 handled by the host computer 1, which corresponds to the area in the primary volume 26p in the storage system 2, is created.

When the process in this flowchart is executed in the host computer 1 at the time of starting the job, reflecting area identifiers corresponding to all the areas corresponding to all the files 230 used by the job may be created.

In this case, the journal reflecting area registering request processing module 1100 refers to the job management table 120 to obtain file identifiers corresponding to all the entries corresponding to the job identifier 112 prior to referring to the catalog 250. Then, for all the obtained files, the journal reflecting area registering request processing module 1100 obtains the logical volume identifiers for the primary volume 26p that stores the file 230 (step S1101). Next, the reflecting area registering request processing module 1100 refers to all the file allocation information stored in the primary volume 26p to obtain addresses and data lengths of the areas storing the files (step S1102). Then, the journal reflecting area registering request processing module 1100 transfers the allocation information of all the files used by the job to the reflecting area registering module 2100 (step S1103). In response to the transfer of the allocation information, the reflecting area registering module 2100 creates reflecting area identifiers corresponding to all the files 230 and returns the created reflecting area identifiers to the journal reflecting area registering request processing module 1100 (step S1104). In response to the transmission of the reflecting area identifiers, the journal reflecting area registering request processing module 1100 creates the entries 111 corresponding to the respective files 230 in the reflecting area identifier management table 110 so as to store the corresponding file identifiers 112 and reflecting area identifiers 222 in the entries 111 (step S1105).

Figure 10:
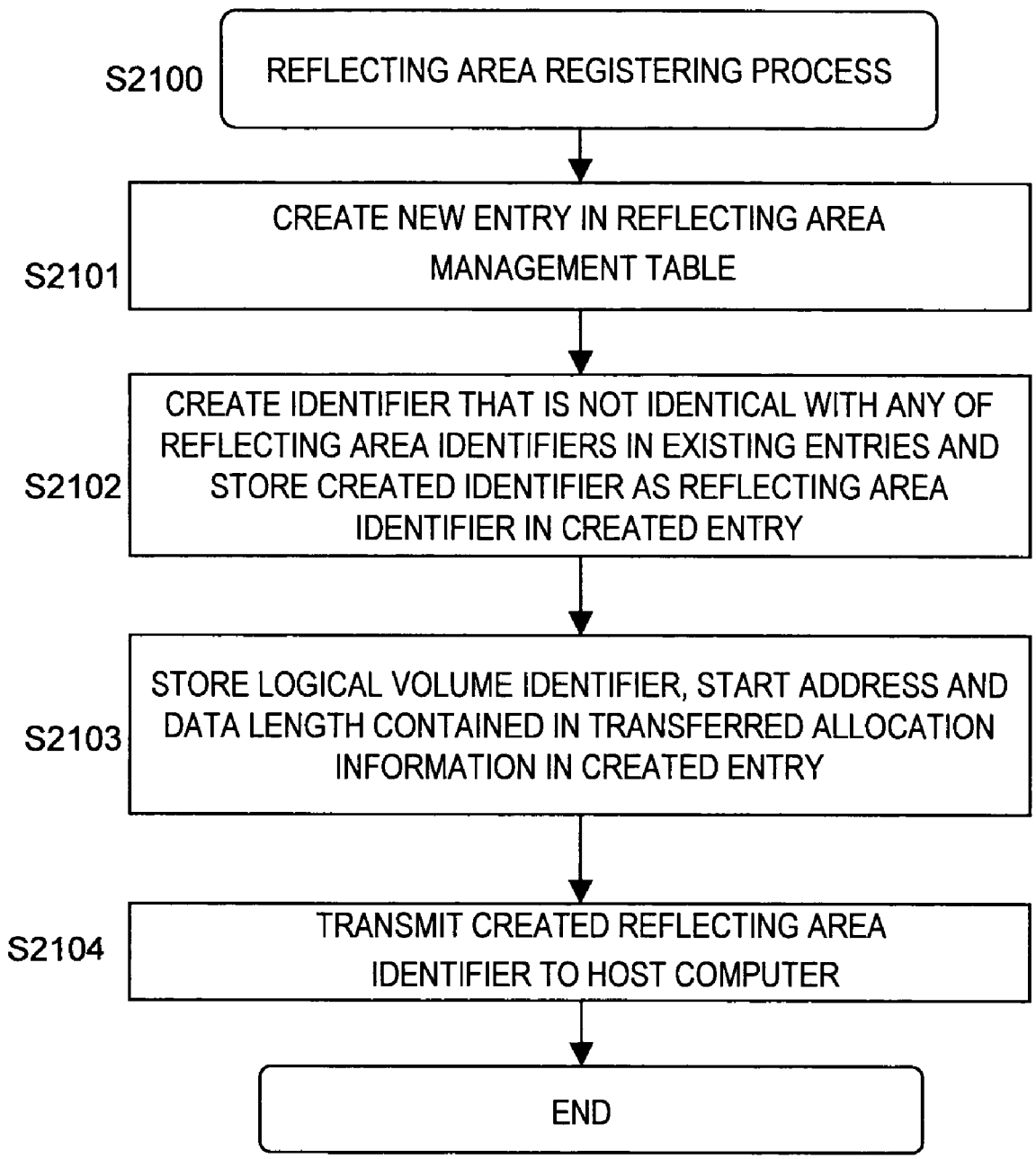
FIG. 10 is a flowchart of a reflecting area registering process according to the first embodiment of this invention.

FIG. 10 is a flowchart of the reflecting area registering process.

The reflecting area registering module 2100 executes the process shown in this flowchart (step S2100) when the host computer 1 transmits data (a reflecting area registering request), to which an identification code of the reflecting area registering request is attached, to the storage system 2 (step S1103 of FIG. 7).

First, the reflecting area registering module 2100 creates a new entry 221 in the reflecting area management table 220 (step S2101).

Next, the reflecting area registering module 2100 refers to the existing entries 221 in the reflecting area management table 221 so as to create a reflecting area identifier 222 which is not identical with any of the reflecting area identifiers 222 of the existing entries 221. Then, the reflecting area registering module 2100 stores the created reflecting area identifier 222 in the created entry 221 (step S2102).

Next, the reflecting area registering module 2100 stores the logical volume identifier, the start address, and the data length contained in the allocation information transferred from the journal reflecting area registering request processing module 1100 of the host computer 1 as the logical volume identifier 223, the start address 224, and the data length 225 of the created entry 221 (step S2103).

When the storage in the entry 221 of the reflecting area management table 220 is completed, the reflecting area registering module 2100 transmits the newly created reflecting area identifier 222 to the host computer 1 (step S2104).

By the above process, the reflecting area identifier 222 corresponding to the file 230, to which the request from the host is addressed, is created and then is transmitted to the host computer 1.

Figure 11:
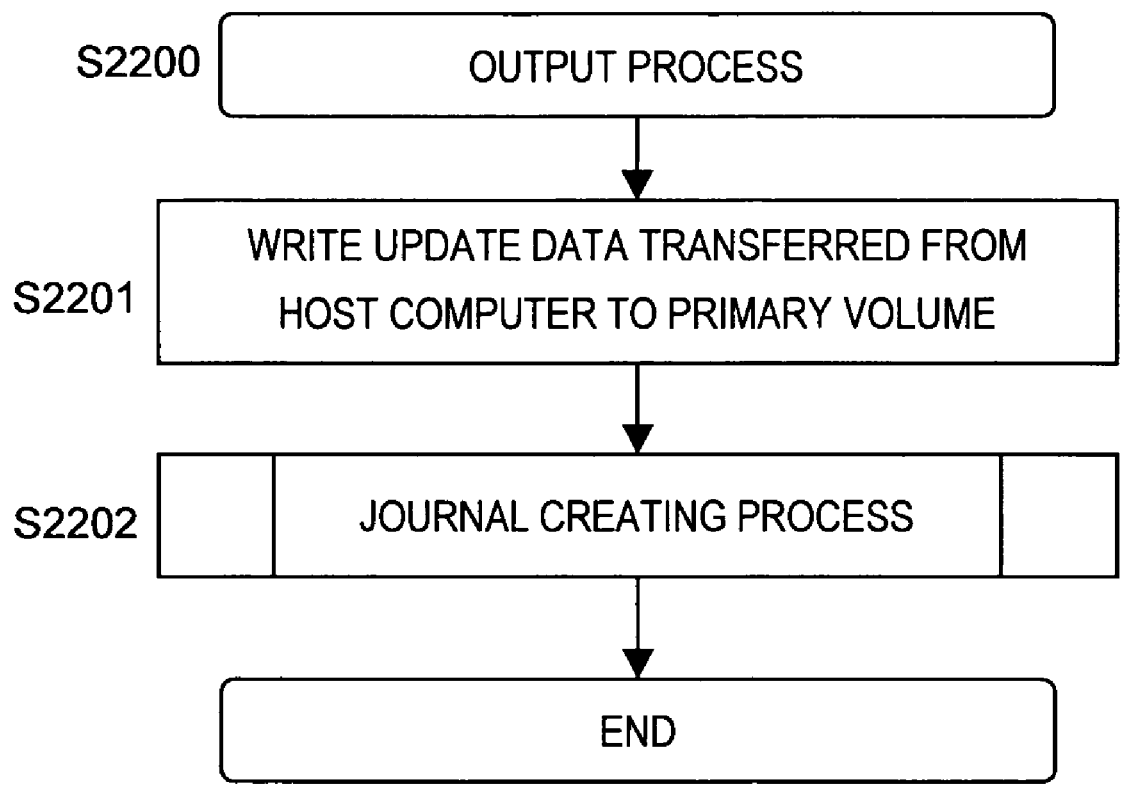
FIG. 11 is a flowchart of an output process according to the first embodiment of this invention.

FIG. 11 is a flowchart of the output process.

The application program of the OS/AP 100 of the host computer 1 issues an output request to the file 230 in the storage system 2. The output request is performed by transferring update data, to which an identification code of the output request is attached, to the storage system 2.

In the storage system 2, when the update data with the identification code of the output request is transferred, the outputting module 2200 executes the process shown in this flowchart (step S2200).

First, the outputting module 2200 writes the update data transferred from the host computer 1 in an area in the primary volume 26p, to which the request is addressed (step S2201).

At this time, when the primary volume 26p corresponding to an update data write destination is a target from which the journal is to be obtained, the outputting module 2200 passes the process to the journal creating module 2300 so that the journal creating module 2300 executes a journal creating process (FIG. 12) (step S2202).

Figure 12:
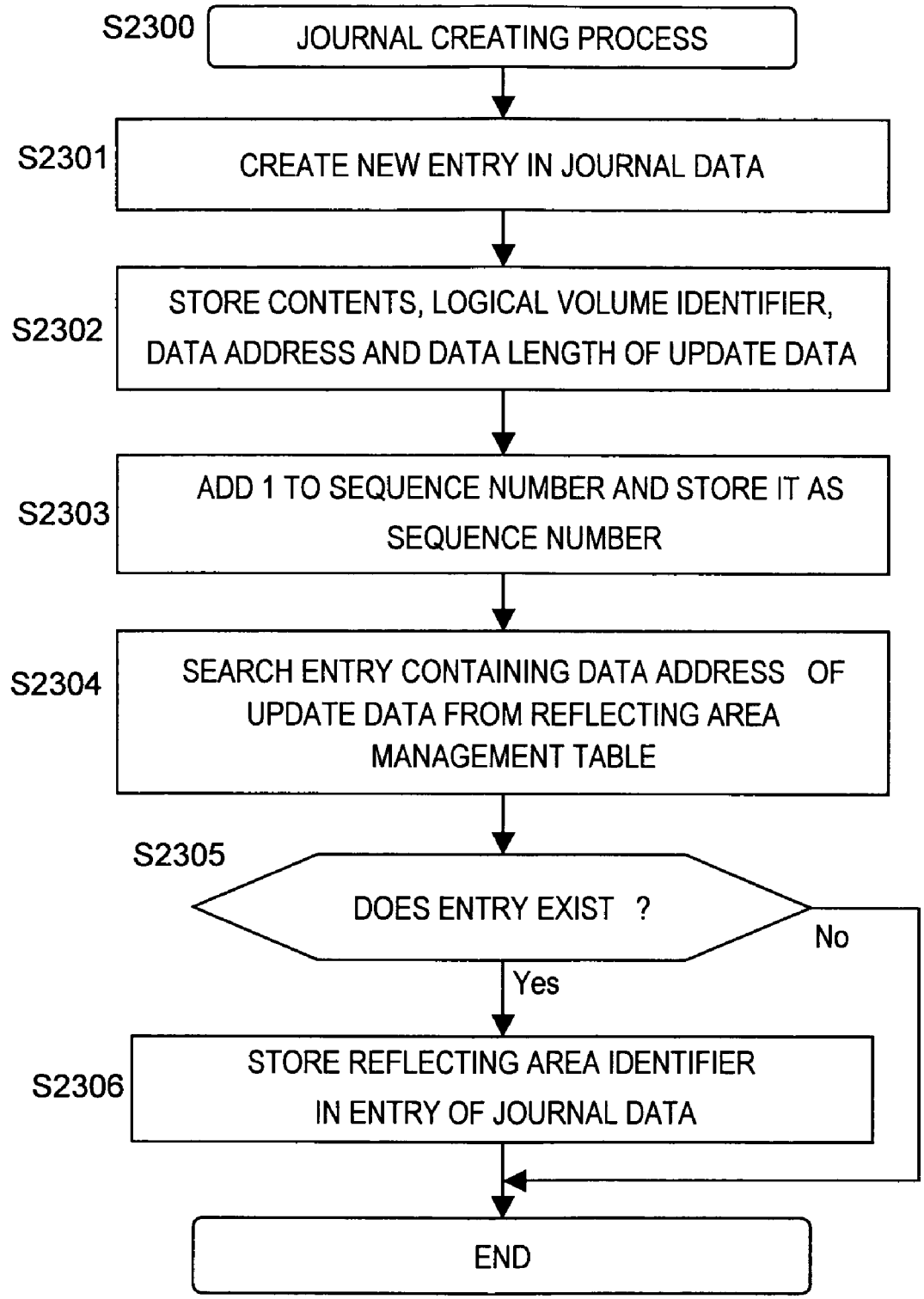
FIG. 12 is a flowchart of a journal creating process according to the first embodiment of this invention.

FIG. 12 is a flowchart of the journal creating process.

The journal creating module 2300 executes the process in this flowchart (step S2300) when data is written to the primary volume 26p from which the journal is to be obtained (step S2202 of FIG. 11).

First, the journal creating module 2300 creates a new entry 201 in the journal data 200 (step S2301).

Next, the journal creating module 2300 stores the contents of the update data, the logical volume identifier of the primary volume 26p, the data address, and the data length as the update data 202, the logical volume identifier 203, the data address 204, and the data length 205 in the created entry 201 (step S2302).

Next, the journal creating module 2300 adds 1 to the sequence number stored in the shared memory 27 so as to store the obtained sequence number as the new sequence number 206 (step S2303).

Next, the journal creating module 2300 refers to the reflecting area management table 220 so as to search for the entry 221 including the data address of the update data (step S2304). Then, it is judged whether or not the entry 221 including the data address of the update data exists (step S2305).

When it is judged that the entry 221 including the data address of the update data exists, the journal creating module 2300 stores the searched reflecting area identifier 222 as the reflecting area identifier 207 in the entry 201 created in the step S2301 (step 2306).

By the above process, the update data, to which the output request from the host computer 1 is addressed, is written to the primary volume 26*p* while being stored in the journal data 200.

Figure 13:
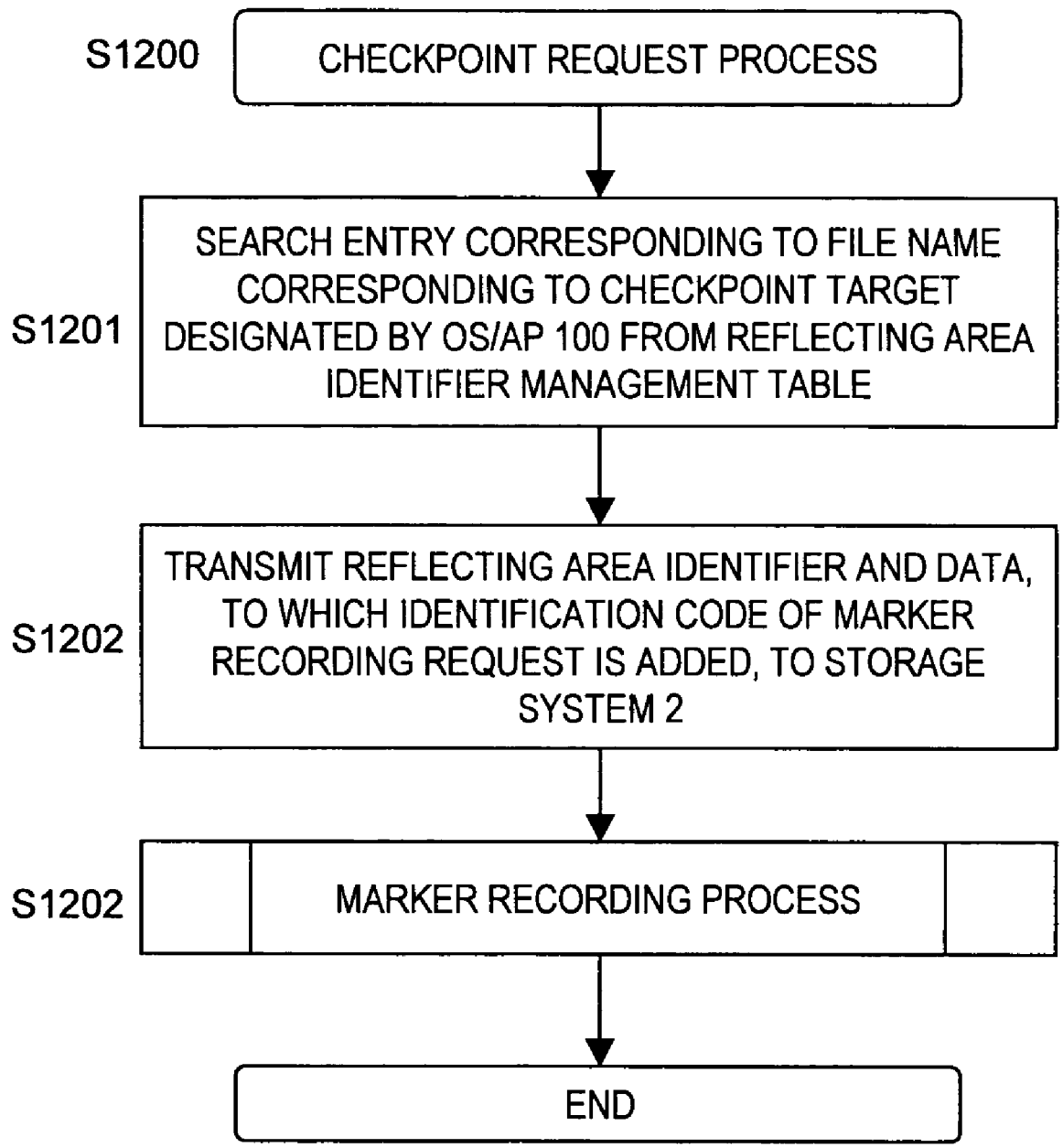
FIG. 13 is a flowchart of a checkpoint request process according to the first embodiment of this invention.

FIG. 13 is a flowchart of the checkpoint request process.

The OS/AP 100 issues a checkpoint request when no input and output is performed for the file 230 so that unoutput data does not exist on the host computer 1, for example, in the case of file closing or job finishing. In response to the checkpoint request, the checkpoint request processing module 1200 executes the process in this flowchart (step S1200).

First, the checkpoint request processing module 1200 searches the reflecting area identifier management table 110 for the entry 111 corresponding to the file name corresponding to the checkpoint designated by the checkpoint request issued from the OS/AP 100 (step S1201).

Next, the checkpoint request processing module 1200 obtains the reflecting area identifier 113 from the searched entry 111. Then, the checkpoint request processing module 1200 transmits data, to which the identification code of the marker recording request is attached, to the storage system 2 (step S1202).

Upon reception of the data, the marker recording module 2400 of the storage system 2 executes a marker recording process (step S1203).

Figure 14:
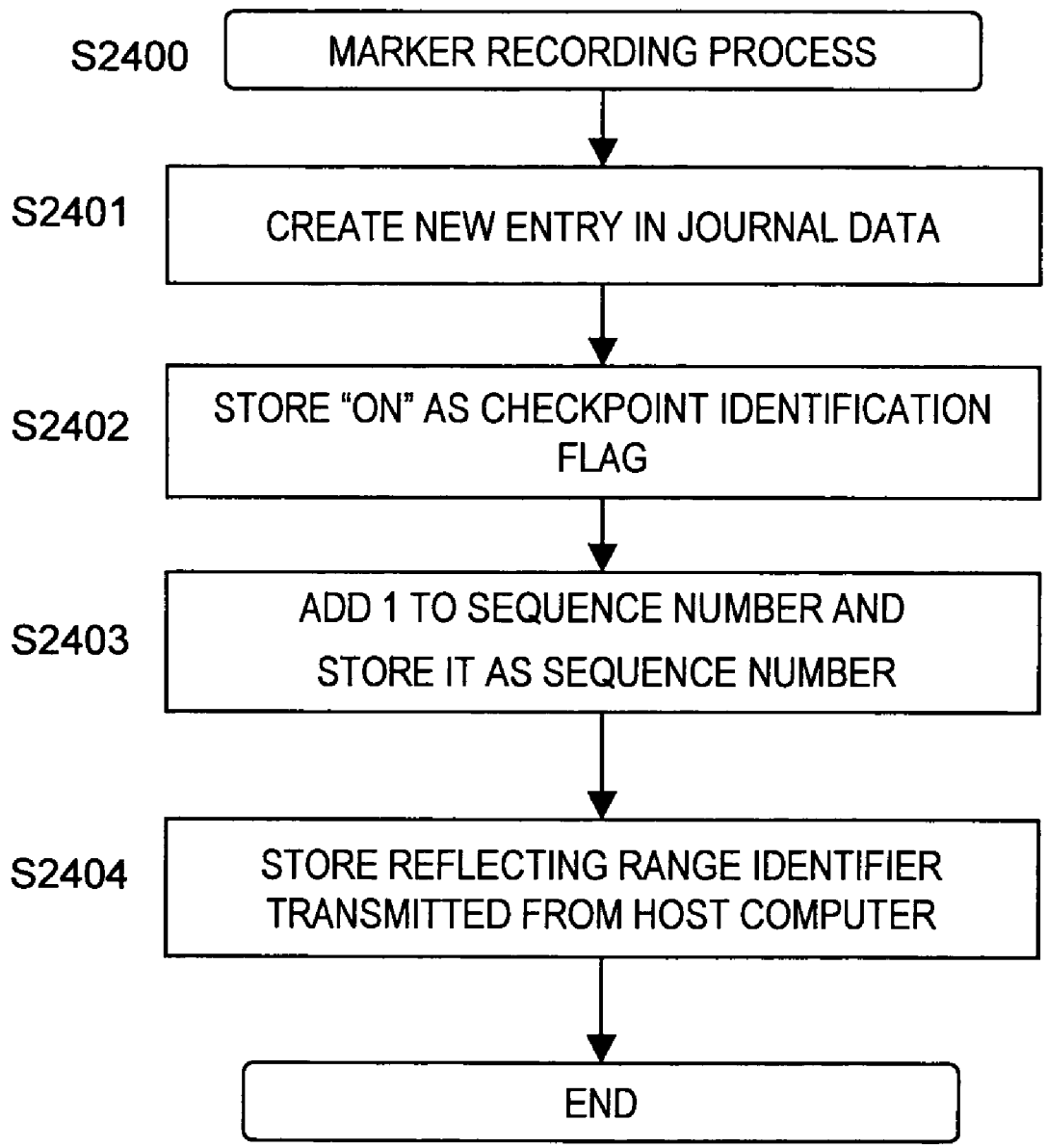
FIG. 14 is a flowchart of a marker recording process according to the first embodiment of this invention.

FIG. 14 is a flowchart of the marker recording process.

When the data, to which the identification code of the marker recording request is attached, is transferred to the marker recording module 2400, the marker recording module 2400 executes the process in this flowchart (step S2400).

First, the marker recording module 2400 creates a new entry 201 in the journal data 200 (step S2401).

Next, the marker recording module 2400 stores "ON" as the checkpoint identification flag 208 of the newly created entry 201 (step S2402). Moreover, the marker recording module 2400 adds 1 to the sequence number stored in the shared memory 27 so as to store the obtained sequence number as the new sequence number 206 (step S2403). Then, the marker recording module 2400 stores the reflecting area identifier 222 transferred from the host computer 1 as the reflecting area identifier 207 of the newly created entry 201 (step S2404). The newly created entry 201 indicates a checkpoint and serves as the marker.

By the above process, the marker is stored in the entry 201 of the journal data 200.

Figure 15:
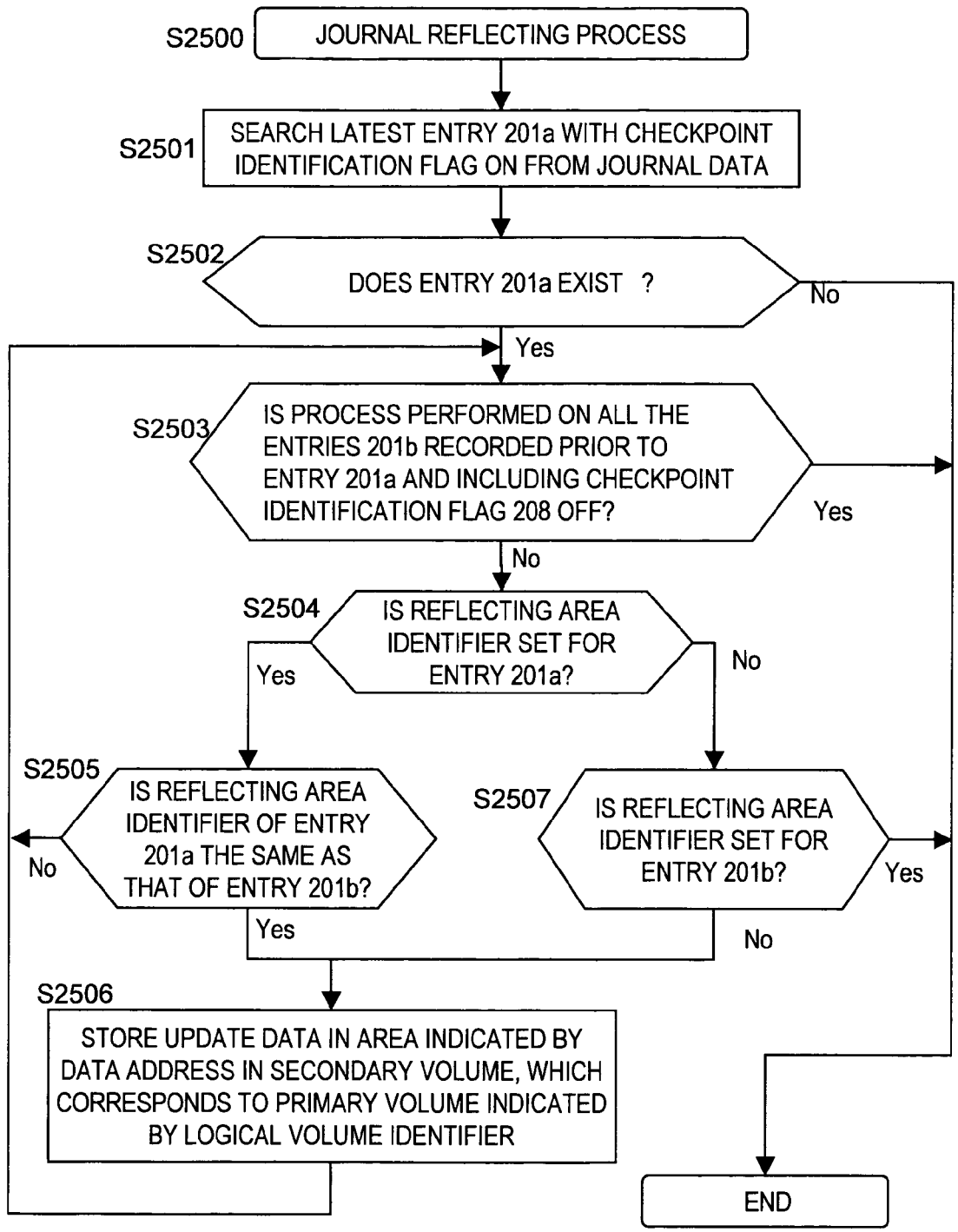
FIG. 15 is a flowchart of a journal reflecting process according to the first embodiment of this invention.

FIG. 15 is a flowchart of the journal reflecting process.

After judging that a capacity of the journal volume 26*j* that stores the journal data 200 is insufficient, the journal reflecting module 2500 executes the process in this flowchart (step S2500). Alternatively, the process in this flowchart may be executed when the journal reflecting request is issued from the host computer 1 or when the journal reflecting module 2500 confirms that the entry 201 of the marker is stored in the journal data 200.

First, the journal reflecting module 2500 searches the journal data 200 for the latest entry 201 of the entries 201 with their checkpoint identification flags 208 being ON (step S2501). Hereinafter, the latest entry 201 is referred to as an entry 201*a*.

The journal reflecting module 250 judges whether or not the entry 201*a* exists (step S2502). When the journal reflecting module 250 judges that the entry 20 la exists, the following process is executed for all the entries 201 with the checkpoint identification flags 208 being OFF among the entries 201 stored prior to the storage of the entry 201*a*. The entries 201 with the checkpoint identification flags 208 being OFF among the entries 201 stored prior to the storage of the entry 201*a* are referred to as entries 201*b*.

When the journal reflecting module 2500 judges that the entry 201*a* does not exist, the process is terminated.

First, the journal reflecting module 2500 judges whether or not the process in the steps S2504 through S2506 has been completed for all the entries 201*b* (step S2503).

When the journal reflecting module 2500 judges that the process has been completed for all the entries 201*b*, the process is terminated.

When it is judged that there is the entry 201*b* for which the process is not executed yet, the journal reflecting module 2500 judges whether or not the reflecting area identifier 207 is set in this entry 201*b* (step S2504). When it is judged that the reflecting area identifier 207 is set, the process proceeds to a step S2505. On the other hand, when it is judged that the reflecting area identifier is not set, the process proceeds to a step S2507.

In the step S2505, the journal reflecting module 2500 compares the reflecting area identifier 207 in the entry 201*a* and the reflecting area identifier 207 in the entry 201*b* with each other so as to judge whether or not the reflecting area identifiers 207 are the same (step S2505).

When it is judged that the two reflecting area identifiers 207 are the same, the journal reflecting module 2500 obtains the secondary volume 26*s* corresponding to the primary volume 26*p* indicated by the logical volume identifier 203 of the entry 201*b* from the pair management table 240. Then, the journal reflecting module 2500 stores the update data 202 of the entry 201*b* in an area in the secondary volume 26*s*, which corresponds to the data address 204 of the entry 201*b* (step S2506).

On the other hand, when it is judged that the two reflecting area identifiers 207 are not the same, the process returns to the step S2503 so as to execute the process for the next entry 201*b*.

In the step S2507, the journal reflecting module 2500 judges whether or not the reflecting area identifier 207 is set for the entry 201*b*. When it is judged that the reflecting area identifier 207 is not set, the process proceeds to the step S2506 so as to store the update data of the entry 201*b* in the secondary volume 26*s*. When it is judged that the reflecting area identifier 207 is not set, the process is terminated.

By the above process, of all the update data stored in the journal data 200, only the update data with the same reflecting area identifier as that of the entry 201*a* of the marker is stored in the secondary volume 26*s*. In this manner, only the file 230 obtained at the time when the request for a checkpoint is made from the host computer 1, in other words, the file 230 for which the input and output are completed, can be obtained as snapshot data.

In this embodiment, the journal creating module 2300 refers to the reflecting area management table 220 so as to judge whether or not the update data is contained in the reflecting area (step S2304 of FIG. 12). Alternatively, the journal reflecting module 2500 may judge whether or not the update data is contained in the reflecting area. In this case, the steps S2304 through S2306 in the journal creating process (FIG. 12) are omitted. Then, in the step S2505 of the journal reflecting process (FIG. 14), the journal creating module 2300 refers to the reflecting area management table 220 to search for the entry 201 satisfying the following relation.

the data address 224<the data address 204<the entry 201b<the data address 224+the data length 225

In this manner, the processing speed of the data output request issued from the host computer 1 can be increased. Furthermore, the processing efficiency of the journal reflecting process can be further increased by executing the journal reflecting process when the storage system 2 is idle.

Second Embodiment

Next, a computer system according to a second embodiment of this invention will be described.

Figure 16:
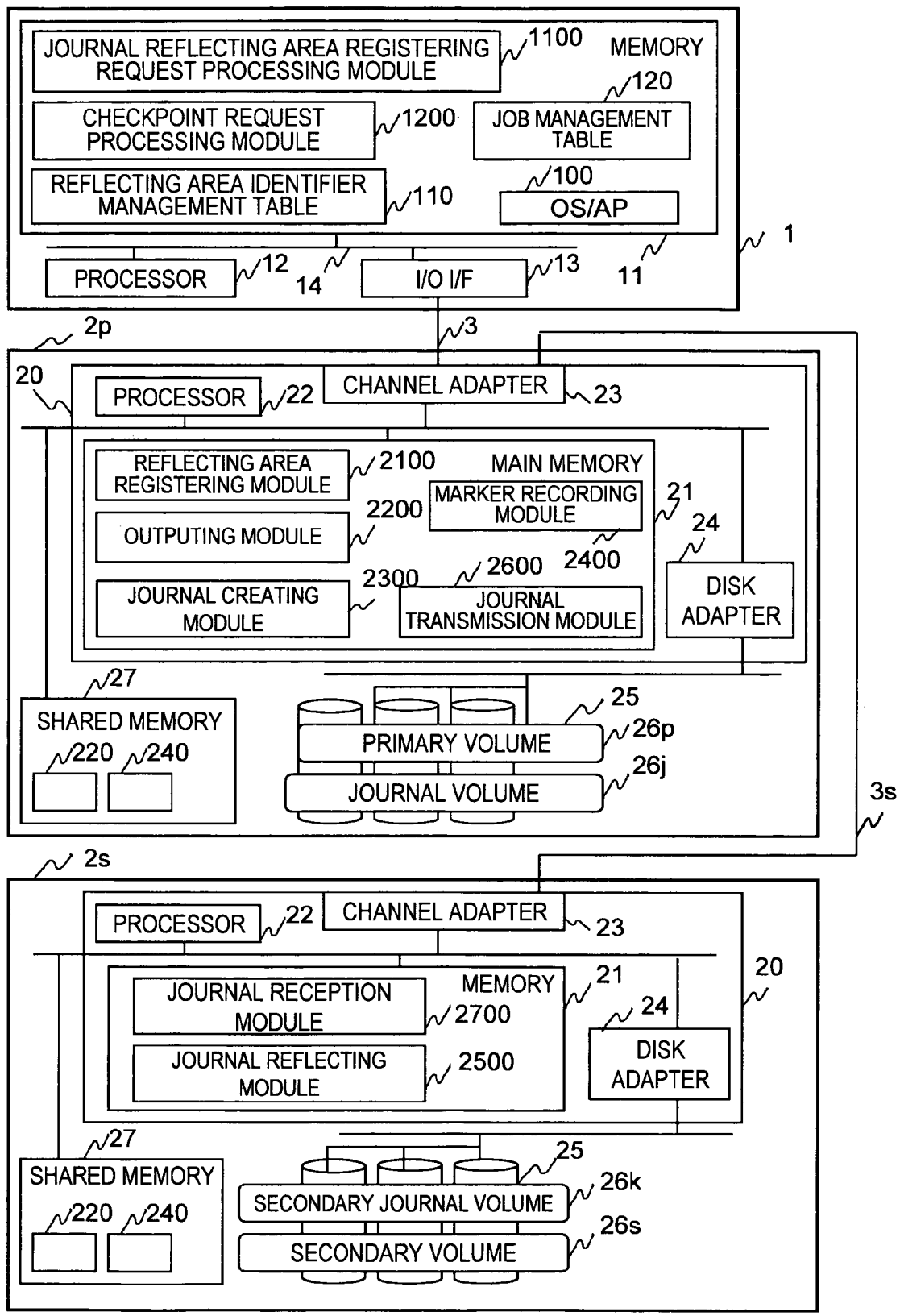
FIG. 16 is a configuration block diagram of a computer system according to a second embodiment of this invention.

FIG. 16 is a configuration block diagram of the computer system according to the second embodiment of this invention.

The components having the same functions as those of the components in the first embodiment are denoted by the same reference symbols, and the descriptions thereof are herein omitted.

The computer system according to the second embodiment comprises the host computer 1 and storage systems 2p and 2s. This second embodiment differs from the first embodiment in that the secondary volume 26s is comprised in the storage system 2s which is independent of the storage system 2p including the primary volume 26p.

The reflecting area registering module 2100, the I/O processing module 2200, the journal creating module 2300, and the marker recording module 2400 are provided in the storage system 2p including the primary volume 26p. On the other hand, the journal reflecting module 2500 is provided in the storage system 2s including the secondary volume 26s. Furthermore, the storage system 2s comprises a secondary journal volume 26k as one of the logical volumes. The secondary journal volume 26k is a destination to which the journal data 200 stored in the journal volume 26j comprised in the storage system 2p is transferred.

Furthermore, the storage system 2p comprises a journal transmission module 2600 that transmits the journal data 200 to the storage system 2s including the secondary volume 26s. Furthermore, the storage system 2s comprises a journal reception module 2700 that receives the journal data 200 transmitted from the storage system 2p.

Next, a process executed by the computer system according to the second embodiment will be described.

When a new entry 201 is added to the journal data 200 in response to an output request issued from the host computer 1, the journal transmission module 2600 transmits the added entry 201 through a communication path 3s from the storage system 2p so as to store the entry 201 in the journal data 200 in the secondary journal volume 26k.

Thereafter, the journal reflecting module 2500 reflects the update data stored not in the journal data 200 in the journal volume 26j but in the journal data 200 in the secondary journal volume 26k, to the secondary volume 26s.

The process of the reflecting area registering module 2100 is approximately the same as that of FIG. 10 described above. When the journal reflecting module 2500 of the storage system 2s judges whether or not the update data is contained in the reflecting area as described above, it is necessary to provide the reflecting area management table 220 in the storage system 2s. In this case, a process of making the reflecting area management table 220 in the storage system 2p and the reflecting area management table 220 in the storage system 2s equal to each other is required. More specifically, in the step S2104 of the reflecting area registering process (FIG. 10), the created reflecting area identifier 222 is transmitted to the host computer 1 as well as to the reflecting area management table 220 in the storage system 2s.

Alternatively, the created reflecting area identifier 222 may be stored in the journal data 200 in the storage system 2p. Then, the journal data 200 containing the reflecting area identifier 222 may be transmitted to the storage system 2s by the following process.

Figure 17:
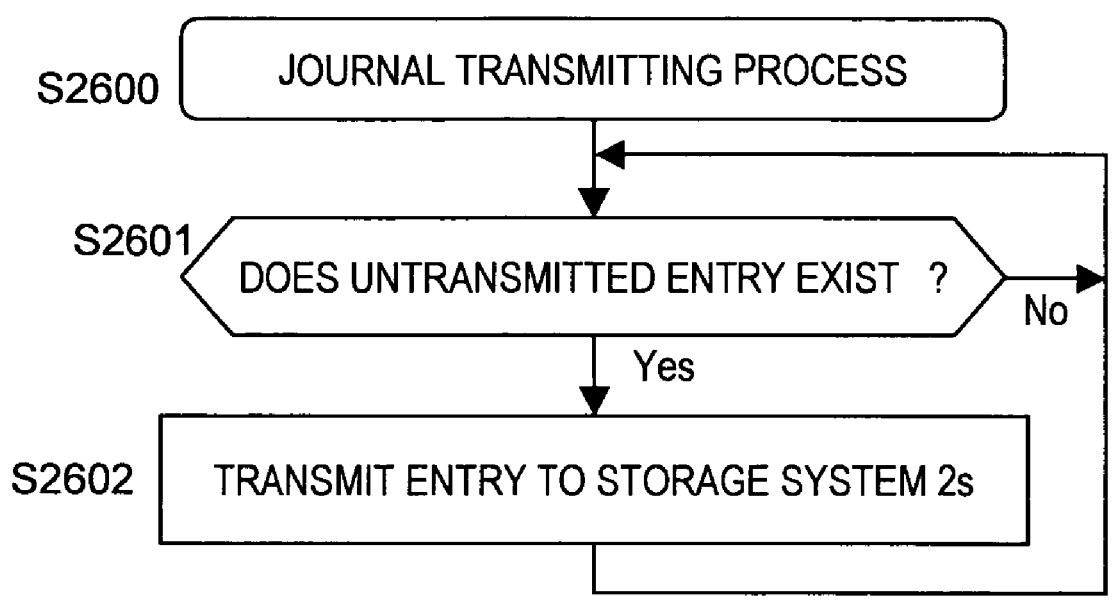
FIG. 17 is a flowchart of a journal transmission process according to the second embodiment of this invention.

FIG. 17 is a flowchart of the journal transmission process.

In the storage system 2p, in the case where the journal transmission module 2600 judges that a capacity of the journal volume 26j storing the journal data 200 is insufficient, the journal transmission module 2600 executes the process in this flowchart (step S2600) when a journal transmission request is issued from the host computer 1 or when the journal transmission module 2600 confirms that the entry 201 of the marker is stored in the journal data 200. In this embodiment, a location of the already-transmitted journal data entry 201 in the primary volume 26p is stored in the shared memory 27 or the memory 21.

First, the journal transmission module 2600 judges whether or not any entry is stored after the entry 201 at the stored location in the primary volume 26p (step S2601). When such an entry exists, the entry 201 is transmitted to the storage system 2s (step S2602).

Figure 18:
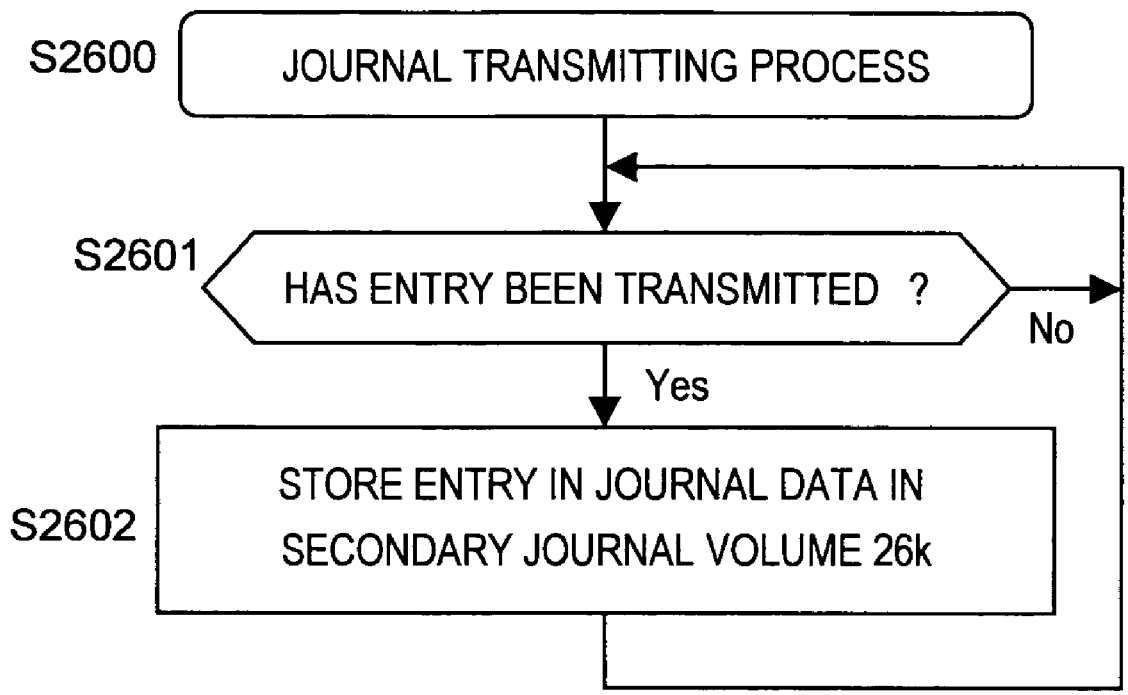
FIG. 18 is a flowchart of a journal reception process according to the second embodiment of this invention.

FIG. 18 is a flowchart of the journal reception process.

The journal reception module 2700 constantly waits for the transmission of the entry 201 from the journal transmission module 2600 (step S2700).

Then, the journal reception module 2700 judges whether or not the entry 201 has been transmitted from the journal transmission module 2600 (step S2701). When it is judged that the entry 201 has been transmitted, a new entry is added to the journal data 200 in the secondary journal volume 26k so as to store the transmitted entry 201 (step S2702).

By the above process, even in the computer system including the storage system 2p for storing the primary volume 26p and the storage system 2s for storing the secondary volume 26s, the process described in the first embodiment above can be executed.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:
a host computer comprising an interface coupled to a storage system through a network, a processor coupled to the interface, and a memory coupled to the processor; and
the storage system comprising an interface coupled to the host computer through a communication path, a disk drive that stores data, a controller that controls input and output of data to/from the disk drive, and a memory that stores information, wherein:
the disk drive comprises a first area that stores data accessed by the host computer, a second area that stores update data of the data stored in the first area, and a third area that stores a copy of the data stored in the first area;
the controller comprises an outputting module that outputs data to the disk drive, a creating module that creates an entry for the update data, a reflecting module that reflects the update data to the third area, and a marker processing module that creates a marker;

the outputting module updates the data stored in the first area based on an update request of the data from the host computer;

the creating module stores the entry for the update data corresponding to the update request in the second area, the second area comprising a plurality of entries corresponding to update requests from the host computer;

the marker processing module creates the marker, the marker containing information of the range in which the data is stored and permission information having a first data state indicating that the data is allowed to be stored in the third area and a second data state indicating that the data is not allowed to be stored in the third area, based on a request of creating the marker from the host computer to store the created marker in the second area; and the reflecting module searches the plurality of entries in the second area for the marker, and when the marker is found, the reflecting module obtains the update data corresponding to the data storing range which is stored prior to the marker and reflects the obtained update data to the third area when the permission information of the marker is in the first data state, and wherein when the marker is not found, the reflecting module does not reflect data to the third area.

2. The computer system according to claim 1, wherein:

the controller comprises an area registering module that stores a first identifier indicating the range of the first area, which stores the data, in the memory;

the outputting module updates the data stored in the first area based on the update request of the data from the host computer;

the creating module refers to the area registering module to obtain the first identifier corresponding to the data and stores the entry for the update data in association with the first identifier and the obtained first identifier in the second area;

the marker processing module stores the marker containing the first identifier corresponding to the data and a second identifier indicating whether or not the data is allowed to be stored in the third area in the second area based on the request of creating the marker from the host computer; and the reflecting module refers to the marker, obtains the first identifier stored prior to the marker, and reflects the update data associated with the obtained first identifier to the third area.

3. The computer system according to claim 2, wherein the reflecting module refers to the marker, and reflects the update data stored prior to the marker, which is not associated with the first identifier, to the third area when the first identifier is not stored in the marker.

4. The computer system according to claim 1, wherein:

the controller comprises an area registering module that stores a management table containing a first identifier indicating the range of the first area which stores the data, in the memory;

the outputting module updates the data stored in the first area based on the update request of the data from the host computer;

the creating module stores the update data in the second area;

the marker processing module stores the marker which contains the first identifier corresponding to the data and the second identifier indicating whether or not the data is allowed to be stored in the third area, in the second area based on the request of creating the marker from the host computer; and the reflecting module refers to the marker, obtains the update data stored prior to the marker, and reflects the update data to the third area when the obtained update data is a data storing range corresponding to the first identifier stored in the marker.

5. The computer system according to claim 1, wherein:

the disk drive stores data constituting a file to be processed by the host computer; and the host computer transmits the marker creating request corresponding to the data constituting the file to the storage system when closing the file.

6. The computer system according to claim 1, wherein:

the disk drive stores data constituting a file created by an application software executed on the host computer in a part of the first area, which is associated with the application software; and the host computer transmits the marker creating request corresponding to the data constituting the file to the storage system when the application software terminates a process using the file.

7. A computer system, comprising:

a host computer comprising an interface coupled to a first storage system through a network, a processor coupled to the interface, and a memory coupled to the processor;

the first storage system comprising an interface coupled to the host computer through a network, a first disk drive that stores data, a first controller that controls input and output of data to/from the first disk drive, and a memory that stores information; and a second storage system comprising an interface coupled to the first storage system through a network, a second disk drive that stores data, a second controller that controls input and output of data to/from the second disk drive, and a memory that stores information, wherein:

the first disk drive comprises a first area that stores data accessed by the host computer and a second area that stores update data of the data stored in the first area;

the second disk drive comprises a fourth area that stores a copy of the update data and a fifth area that stores a copy of the data stored in the first area;

the first controller comprises an outputting module that outputs data to the disk drive, a creating module that creates an entry containing the update data, a marker processing module that generates a marker, and a transmission module that transmits the created entry and the created marker to the second storage system;

the second controller comprises a reception module that receives the entry and the marker transmitted from the first storage system and a reflecting module that reflects the update data to the fifth area;

the outputting module updates the data stored in the first area based on an update request of the data from the host computer;

the creating module stores the entry containing the update data for the update request in the second area, the second area comprising a plurality of entries corresponding to update requests from the host computer;

the marker processing module creates a marker containing information of the range in which the data is stored and permission information having a first data state indicating that the data is allowed to be stored in the fifth area and a second data state indicating that the data is not allowed to be stored in the fifth area, based on a request of creating the marker from the host computer to store the created marker in the second area;

the transmission module transmits the entry and the marker to the second storage system;

the reception module stores the entry containing the update data and the marker transmitted from the first storage system in the fourth area; and the reflecting module searches the plurality of entries in the second area for the marker transmitted from the first storage system. and when the marker is found, the reflecting module obtains the update data corresponding to the data storing range which is stored prior to the marker, and reflects the obtained update data to the fifth area when the permission information of the marker is in the first data state, and wherein when the marker is not found, the reflecting module does not reflect data to the fifth area.

8. The computer system according to claim 1, wherein the processor of the host computer manages information of an area in the disk drive which stores the data, requests the storage system for the information of the area in the disk drive, which stores the data, and stores the information of the area, which is transmitted from the storage system, in association with a corresponding data identifier, in the memory.

9. The computer system according to claim 8, wherein, when closing a file processed by the host computer, the processor of the host computer designates information of the area storing data constituting the file to transmit a request of creating a marker containing information that allows storage of a copy of the data.

10. The computer system according to claim 8, wherein the processor of the host computer executes an application software that processes a file, designates information of the area storing data constituting the file, and transmits a request of creating a marker containing information that allows storage of a copy of the data when the application software terminates a process using the file.

11. A data copying method executed in a computer system comprising: a host computer comprising an interface coupled to a storage system through a network, a processor coupled to the interface, and a memory coupled to the processor; and the storage system comprising an interface coupled to the host computer through a communication path, a disk drive that stores data, a controller that controls input and output of data to/from the disk drive, and a memory that stores information, wherein the disk drive comprises a first area that stores data accessed by the host computer, a second area that stores update data of the data stored in the first area, and a third area that stores a copy of the data stored in the first area, the data copying method comprising:

a first step of updating data stored in a first area based on an update request of the data from the host computer;

a second step of storing an entry for the update data corresponding to the update request in the second area, the second area comprising a plurality of entries corresponding to update requests from the host computer;

a third step of storing a marker, which contains information of a range that stores the data and permission information indicating whether or not the data is allowed to be stored in the third area, in the second area based on a request of creating the marker which includes information indicating whether or not the update data is allowed to be stored in the third area from the host computer, the permission information having an ON data state and an OFF data state; and a fourth step of searching the plurality of entries in the second area for the marker and when the marker is found, performing sub-steps of obtaining the update data based on entries stored in the second area prior to the marker, and reflecting the obtained update data to the third area when the data state of the permission information of the marker is in the ON state.

12. The data copying method according to claim 11, further comprising a fifth step of storing a management table containing a first identifier indicating a range of the first area, which stores the data, in the memory, wherein:

the second step comprises referring to the management table in the memory and obtaining the first identifier corresponding to the update data and storing the first identifier with the entry for the update data in the second area;

the third step comprises storing a marker containing the first identifier corresponding to the update data and a second identifier indicating whether or not the data is allowed to be stored in the third area in the second area based on a request of creating the marker containing information indicating whether or not the update data is allowed to be stored in the third area from the host computer; and the fourth step comprises searching for the marker, obtaining an entry containing the first identifier from the second area which is stored prior to the marker, and reflecting the update data contained in the obtained entry to the third area.

13. The data copying method according to claim 11, wherein the fourth step comprises referring to the marker, determining whether the marker contains a first identifier, and when it is determined that the marker does not contain the first identifier, obtaining an entry which is stored prior to the marker and does not contain the first identifier, and reflecting the update data contained in the obtained entry to the third area.

14. The data copying method according to claim 11, further comprising a fifth step of storing a management table containing a first identifier indicating a range of the first area, which stores the data, in the memory, wherein:

the second step comprises storing the update data in the entry store the entry in the second area;

the third step comprises storing a marker containing the first identifier corresponding to the data and a second identifier indicating whether or not the data is allowed to be stored in the third area in the second area based on a request of creating the marker containing information indicating whether or not the update data is allowed to be stored in the third area from the host computer; and the fifth step comprises referring to the marker, obtaining an entry which is stored prior to the marker, and reflecting the update data contained in the obtained entry to the third area when the updated data in the obtained entry is within the data storing range corresponding to the first identifier stored in the marker.

15. The data copying method according to claim 11, wherein:

the disk drive stores data constituting a file processed by the host computer; and when closing the file, the host computer transmits the marker creating request corresponding to the data constituting the file to the storage system.

16. The data copying method according to claim 11, wherein:

the disk drive stores data constituting a file created by an application software operating on the host computer in a part of the first area, which is associated with the application software; and the host computer transmits the marker creating request to the storage system when the application software terminates a process using the file.

* * * * *